Patented Jan. 16, 1934

1,944,046

UNITED STATES PATENT OFFICE 1,944,046

PROCESS OF MANUFACTURING NITROGENOUS FERTILIZER

William H. Waggaman, Baltimore, Md., assignor, by mesne assignments, to The Oberphos Company, Baltimore, Md., a corporation of Maryland No Drawing. Application September 8, 1928
Serial No. 304,844

5 Claims. (Cl. 71—6)

This invention relates to the production of fertilizers and pertains more specifically to the manufacture of nitrogenous fertilizers.

In the past, in the preparation of nitrogenous fertilizers, it has been the practice to treat the normally unavailable nitrogenous material with a suitable digesting agent, such for example, as sulphuric acid or live steam. The use of the first mentioned digesting agent is rather expensive because of the cost of the acid. In practice the second method has not been entirely efficient. It is found that the material produced by the steam digestion may contain a large amount of unconverted product, and, in addition to this, the mass is quite wet or damp.

The present process contemplates primarily the preparation of nitrogenous fertilizers of a very high availability.

An object of the invention is to prepare a nitrogenous fertilizer from unavailable nitrogen material.

Another object is to nitrate a nitrogenous material which is to be employed for the production of fertilizer.

Another object is to subject nitrogenous raw material, which is to be used for the production of fertilizer, to the action of a nitrating agent.

Another object is to nitrate raw products which are to be employed in the production of fertilizers with a waste material.

Yet another object is to utilize oxides of nitrogen in the production of a nitrogenous fertilizer.

A further object is to provide a novel reagent for use in the production of nitrogenous fertilizers.

With these and other equally important objects in view the invention comprehends the treatment of agriculturally unavailable nitrogenous material such as feathers, hair, wool, leather, etc., with a nitrogen containing material which will react therewith to increase the total nitrogen content.

In a preferred modification of the invention I propose to make use of a material which, at the present time, represents a distinct loss in commercial practice.

One object of the invention, therefore, is to recover the oxides of nitrogen which escape from the Gay Lussac Tower of a chamber sulphuric acid plant and to convert these oxides into nitrogenous bodies having a fertilizer value. These oxides are recovered by absorption or combination with certain organic materials, such as feathers, hair, wool and leather, etc.

It is known that the oxides of nitrogen which escape from the exit flue of a chamber plant, constitute a serious loss. The function of the Gay Lussac Tower is to absorb these oxides of nitrogen and recirculate them in the system through the medium of the Glover Tower. Theoretically it should be necessary to supply oxides of nitrogen to a well operated chamber plant only once, since after they have effected the union of sulphur dioxide, oxygen and water (to form sulphuric acid) they are regenerated and are free to perform the same function again.

In actual operation, however, it is necessary to supply, either intermittently or continuously, small amounts of these oxides of nitrogen to make up for the losses entailed in the process. The quantity which must be replaced (in terms of nitrate of soda) under good operating conditions seldom, if ever, falls below 3% of the sulphur burned and adds sixty cents or more to the cost of each ton of 52° Be. sulphuric acid produced.

While some of this loss of oxides of nitrogen is due to absorption by the chamber acid and some to chemical action, the greater bulk of the loss is in the gases which escape absorption in the Gay Lussac Tower. This fact has been recognized and it has been proposed to absorb these escaping gases either in milk of lime or in activated charcoal. These absorbents are subsequently treated to drive off the absorbed gases and return them to the system.

The first method of recovery is open to the serious objection that the solution of nitrate of lime which is formed must not only be evaporated to recover the salt, but the final product is of such a hygroscopic nature that it is difficult to use it in mixed fertilizers.

The second method, namely the absorption of the oxides of nitrogen by activated charcoal, and the subsequent recovery of the gases by the action of heat, involves the use of relatively expensive absorbing agents and the employment of several steps which renders such a process protracted and expensive.

In the proposed method of utilization of these gases such disadvantages are obviated. The process not only provides a means for recovering these oxides of nitrogen in a form readily available as a fertilizer but at the same time they are utilized to convert relatively inactive or unavailable nitrogen containing materials into nitrogeneous fertilizers.

In the preferred method of carrying out the invention organic waste material such as leather, hair, wool, feathers or the like, are loosely packed in a tower constructed of, or lined with, an acid proof ceramic or metallic material and gases from the Gay Lussac Tower are drawn or forced through the mass. It is to be observed that because of their physical structure the materials mentioned constitute very effective fillers for an absorption tower inasmuch as they are of porous or interstitial structure and hence present a very large absorption or reaction surface while offering comparatively little resistance to the passage of the gases.

In the present invention the waste or unabsorbed gases may be conveyed, through any suitable conduit, to the base of the nitration or absorption tower. It is desirable to oxidize the lower oxides of nitrogen as much as possible and to accomplish this air or water vapor may be injected into the treating gas, either in the inlet line or at any desired point in the tower.

If desired a suitable blower may be positioned in the inlet line to the absorption tower so as to control the flow of the gases. It is to be understood that the term "absorption tower" is used herein in a general sense to designate any suitable receptacle for the nitrogenous material through which the gases may be coursed. As is known, there are a wide variety of specific containers which may be employed for this purpose, any one of which will serve to carry out the major concept, namely, to contact the nitrogenous waste material with the nitrogen gases.

I have found that the absorption of the oxides of nitrogen begins immediately and that the mass heats up, due apparently to an exothermic reaction between the organic material and the active gases. In addition to this the physical constitution of the absorbent undergoes a change. For example, if leather is subjected to the action of the oxides of nitrogen it soon changes to an orange or reddish color but will continue to take up the gases until the toughness of the fiber is largely destroyed.

I have found that when leather scrap is exposed, for a one-half hour or more, to the action of these gases it will take up approximately 2% of its weight of combined nitrogen and in physical character it changes from a tough fiber to a material that may be readily torn between the fingers. If the exposure is continued farther, the leather scrap soon becomes so brittle that it can readily be crushed.

In the preferred method of treatment, however, the material is removed from the tower before it has been fully nitrated and is then subjected to a conversion treatment. This treatment may be effectuated by depositing the nitrated material in an air tight container or autoclave and heating it to a temperature of between 90 and 110° C. for forty-five minutes more or less, while under its autogenous pressure. At the end of such treatment the pressure is released and the mass allowed to cool.

The material which is removed from the autoclave is converted into a dark, crisp, readily ground product and contains from 1½ to 2 units more of ammonia than did the original leather scrap. The nitrogen present is not only in the form of available ammonia but is practically all in an organic form. The analysis of the product shows little or no test for nitrates or inorganic ammonium salts.

The reactions which take place between a reactive nitrogen material like oxides of nitrogen, and such organic materials as leather, wool, waste, etc., is not thoroughly understood. It may be that some picric acid is formed; but if this is so subsequent heating of the mass under pressure apparently changes this over to some other form for I have found that the water extract shows but little coloration or dissolved material. It is to be understood, however, that no attempt is here made to explain the mechanism of the reaction. I have found that if unavailable nitrogenous material is treated in the manner set forth the described product may be obtained.

In describing the preferred method the use of oxides of nitrogen from the Gay Lussac Tower has been suggested. A large and outstanding advantage of such nitrating agent resides in the fact that utilization is made of a material which now represents an appreciable loss in industry. It will be appreciated, however, that the invention is not limited for use directly in conjunction with a lead chamber plant or to the oxides withdrawn from a Gay Lussac Tower. The oxides of nitrogen may be separately prepared. To do this sodium nitrates may be decomposed by sulphuric acid in a nitre pot, and the evolved nitric acid mixed with sulphur dioxide.

Similarly, in lieu of the oxides of nitrogen which have been mentioned, other nitrating agents which will convert the raw material into an available form or increase the ammonia content may be employed. It will be understood that the invention resides broadly in the concept of first subjecting the unavailable nitrogenous material to a nitration step either to partially or wholly convert the material, or to increase the nitrogen content and then complete the conversion step by the application of heat and pressure.

Likewise it will be appreciated that the described process is not the only one which may be practiced. Thus instead of first nitrating the waste or unavailable material in a separate tower and then transferring the incipiently converted product to the autoclave, the whole may be carried out in the autoclave. To do this the material may be placed in a screen basket or the like and introduced into the autoclave. Oxides of nitrogen, as recovered from a Gay Lussac Tower, or as prepared by a separate treatment, may be introduced to the autoclave either intermittently or continuously. After the desired extent of nitration, the flow of gas may be cut off and the autoclave heated by any suitable means. The material is then subjected to conversion conditions of temperature, pressure and time to consummate those reactions which produce the desired end product. In short, the preliminary step of treatment with the reagent and the subsequent step of effecting complete conversion may be carried out in a single container.

The processes which are herein described have been given merely as typical examples of the possible embodiments of the invention, and hence I do not wish to be limited to the particular processes either as regards the sequence of steps or the particular conditions of treatment except as such limitations are clearly imposed by the appended claims.

I claim:

1. A process of manufacturing nitrogenous fertilizers comprising subjecting protein containing material of animal origin to the action of a gaseous nitrating agent, and then subjecting the material after absorption of the nitrating agent to conversion conditions of elevated temperature and pressure.

2. A process of producing nitrogenous fertilizers comprising subjecting protein containing material of animal origin to the action of gaseous oxides of nitrogen to effect absorption of the gaseous oxides of nitrogen in the protein containing material, and then subjecting the material containing the absorbed oxides of nitrogen to conversion conditions of superatmospheric temperature and pressure.

3. A process of producing nitrogenous fertilizers comprising subjecting protein containing material of animal origin to the action of gaseous oxides of nitrogen for a predetermined time, and then heating the resulting mass to between 90 and 100° C. under pressure for a period of time sufficient to convert the ammonia in the mass to an organic form.

4. A process of producing nitrogenous fertilizers comprising subjecting protein containing material of animal origin to the action of oxides of nitrogen in an absorbing zone, then transferring the material containing the absorbed oxides of nitrogen to a confined zone, and heating the material in said confined zone above 100° C. and under its autogenous pressure.

5. A process of producing nitrogenous fertilizers comprising depositing protein containing material of animal origin in a confined zone, continuously introducing a gaseous mixture of the lower oxides of nitrogen into said zone for a predetermined period, then discontinuing the introduction of the gaseous mixture into said zone, and heating the material above 100° C. and under superatmospheric pressure.

WILLIAM H. WAGGAMAN.